Patented Apr. 7, 1931

1,800,024

UNITED STATES PATENT OFFICE

CARL MARCZINCZEK, OF OAKLAND, CALIFORNIA

TENACIOUS AND FIREPROOF COMPOSITION

No Drawing. Application filed March 12, 1928. Serial No. 261,191.

My invention relates to compositions of a tenacious, fire-proof and insulating nature, and it refers especially to an improvement in a composition, disclosed in Letters Patent of the United States, No. 1,574,252, which were granted to me on February 23, 1926, for "method of making light, porous walls."

The main purpose of my present invention is to produce a tenacious, fire-proof and insulating composition, which is adapted to be used in building constructions, either for forming walls, floors, ceilings or roofs, or parts of such walls, floors, ceilings, or roofs, or for forming slabs or blocks or other pieces adapted to be used in connection with work in which it is advantageous to employ a material of a tenacious, fire-proof and insulating nature.

I also propose by my invention to produce a composition, which, when set, may be cut and put into any desired shape by suitable tools in order to adapt the composition for use in different arts or whenever it is required to make or shape objects of a tenacious, fire-proof and insulating character.

The particular advantages of my present invention over the prior art may be better understood by reference to the ingredients that comprise the composition disclosed in the aforementioned patent. My former invention comprises the mixture of a certain percentage of pumice stone with a certain percentage of volcanic ash, lime and plaster of Paris. It has been found, however, that a wall structure of such a composition is not of a sufficient strength to meet the requirements in certain instances, owing to the lightness and porosity of the pumice stone.

By my present invention I contemplate to overcome this inherent weakness, so that a wall structure, or any other object, formed of the composition hereinafter disclosed, will be stronger and otherwise superior to a wall, or any other object, formed by the composition disclosed in the patent.

In fact, the crushing strength of the new composition of my invention is such as to enable a builder to construct complete walls, floors, ceilings, and roofs of buildings without the framework hitherto required therefor thus considerably shortening the time formerly required for building constructions and materially reducing the building cost.

A further important advantage of the new composition of my invention is that nails, or rods, if so required, may be driven thereinto, and screws and bolts may be screwed into it without liability to split or crack the composition, and also that reinforcing materials, such as rods or wire nettings, may be embedded therein, thus causing buildings constructed of the new composition to be of an extraordinary durability.

The composition of my present invention consists of a mixture of volcanic cinders, lava, or pumice; cement; volcanic ash or sand; hydrated lime and gypsum, and a sufficient quantity of water for setting the mixture. Preferably, the ingredients of the composition are mixed in the following proportions:

Volcanic cinders, or lava, or pumice, approximately 45% (in case of pumice use 30% coarse pumice and 15% medium pumice),
Cement, approximately 20%,
Hydrated lime, approximately 5%,
Gypsum, approximately 5%,
Volcanic ash, or ground cinders, or fine ground pumice or sand, approximately 25%,
And a sufficient quantity of water is added for causing the mixture to set.

When thus moistened, the mixture is adapted either to be poured into molds, or to be dashed upon suitable supporting structures, for forming any desired objects, such as walls of buildings, the molds, and the supporting structures preferably being made in sections and adapted to be moved from one place to another so as to be used repeatedly until worn out.

It should be observed that the ingredients referred to as volcanic cinders or lava are coarser and heavier than the pumice stone, while the volcanic ash, or the sand, is adapted to fill the voids between the coarse cinders, so that, with the binding ingredients, lime and gypsum and cement, the present composition supplies such strength to walls or complete buildings constructed thereof as is not possible by the use of my former composition.

It is clear from the foregoing that the present composition, on account of its fireproof and insulating qualities, is peculiarly adapted as a material for the construction of whole buildings, with the exception, of course, of windows and doors, although the latter, if so desired, may also be made of the composition. Such buildings are thus not only protected from fire hazards, but also from being struck by lightning or from any damage that could be caused by defective electric wiring, as the material is a nonconductor of heat, cold and electricity.

I claim as my invention:

A composition consisting of a mixture of approximately 45% of volcanic cinders; approximately 20% cement, approximately 5% hydrated lime, approximately 5% gypsum and approximately 25% fine ground pumice, and a sufficient quantity of water being added to the mixture for causing it to set.

In testimony whereof I affix my signature.

CARL MARCZINCZEK.